(12) United States Patent
Patel et al.

(10) Patent No.: US 6,327,019 B1
(45) Date of Patent: Dec. 4, 2001

(54) DUAL LIQUID-CRYSTAL WAVELENGTH-SELECTIVE OPTICAL SWITCH

(75) Inventors: Jayantilal Patel, State College, PA (US); W. John Tomlinson, Princeton; Janet Lehr Jackel, Holmdel, both of NJ (US)

(73) Assignees: Tellium, Inc., Oceanport; Telcordia Technologies, Inc., Morristown, both of NJ (US)

( * ) Notice: Subject to any disclaimer, the term of this patent is extended or adjusted under 35 U.S.C. 154(b) by 0 days.

(21) Appl. No.: 09/018,097

(22) Filed: Feb. 3, 1998

Related U.S. Application Data (60) Provisional application No. 60/037,411, filed on Feb. 7, 1997.

(51) Int. Cl.[7] ............................. G02F 1/13; H04B 10/06
(52) U.S. Cl. ............................................. 349/196; 359/193
(58) Field of Search ........................... 349/196; 359/193, 359/180, 189; 385/20, 24, 17

(56) References Cited

U.S. PATENT DOCUMENTS

| | | | | |
|---|---|---|---|---|
| 4,385,799 | * | 5/1983 | Soref | 350/96.19 |
| 4,461,543 | * | 7/1984 | McMahon | 350/383 |
| 4,478,494 | * | 10/1984 | Soref | 350/381 |
| 4,516,837 | * | 5/1985 | Soref et al. | 350/347 |
| 4,813,769 | * | 3/1989 | Baker | 350/347 |
| 4,989,941 | * | 2/1991 | Soref | 350/96.18 |
| 5,414,540 | * | 5/1995 | Patel et al. | 359/39 |
| 5,414,541 | * | 5/1995 | Patel et al. | 359/39 |
| 5,446,809 | * | 8/1995 | Fritz et al. | 385/17 |
| 5,740,288 | * | 4/1998 | Pan | 385/11 |

* cited by examiner

Primary Examiner—Kenneth Parker
Assistant Examiner—Mike Qi
(74) Attorney, Agent, or Firm—Morgan, Lewis & Bockius LLP (57) ABSTRACT

A liquid-crystal switching element relying upon a segmented liquid-crystal polarization modulator, at least one frequency-dispersive grating and one or more polarization-dispersive elements, such as Wollaston prisms, to switch separate wavelength-divided signals among four optical paths. The switching is done complementally between the fibers of each pair, and the same switching is done for the two pairs. According to the invention, all four beams can be processed by a single set of serial optics. The invention is particularly useful as an optical interconnect between two optical fiber communications rings in which each ring includes two counter-rotating fibers. The invention advantageously uses a dielectric thin-film beam splitter for one of the polarization-dispersive elements and a Wollaston prism for the other. The reflective embodiment in which a mirror replaces all the components on the output side can be improved by using two semitransparent electrode layers on the input side separated by a quarter-wavelength of dielectric.

8 Claims, 6 Drawing Sheets

DUAL LIQUID-CRYSTAL WAVELENGTH-SELECTIVE OPTICAL SWITCH

RELATED APPLICATION

This application claims benefit of Provisional Application No. 60/037,411, filed Feb. 7, 1997.

FIELD OF THE INVENTION

The invention relates generally to liquid-crystal devices. In particular, the invention relates to such devices incorporated into telecommunications systems.

BACKGROUND ART

Liquid-crystal modulators have become commercially widely known, particularly in two-dimensional display applications such as wrist watches and flat-screen displays. In most of its applications, a liquid-crystal modulator is in fact a polarization converter which somehow affects the polarization of light incident upon it. Other optical components are used to present the correct light polarization to the liquid-crystal modulator and then to filter out the undesired polarization components. In its most commercially popular form, the liquid-crystal modulator uses a twisted nematic liquid crystal. Alignment layers applied to the two electrodes sandwiching the liquid crystal cause the liquid crystal to twist 90° when the electrodes are in the unbiased state. The twist may be an odd multiple of 90° and have small angular increments to account for other effects. Light incident upon the twisted liquid crystal are waveguided along the twisting liquid crystal, whereby the polarization of the light changes from one side to the other of the liquid crystal cell. However, if a sufficiently high voltage is applied to the electrodes, the twisted waveguiding structure in the liquid crystal is destroyed, and the polarization of light traversing the cell is maintained essentially constant. Thus, an electrical signal applied to the liquid-crystal cell modulates the polarization of light transmitted through the cell.

Patel and Silberberg have disclosed in U.S. Pat. Nos. 5,414,540 and 5,414,541, incorporated herein by reference in their entireties, that liquid-crystal devices can be used to switch individual channels of a multi-wavelength signal, such as is common with an optical wavelength-division multiplexed (WDM) communication network. In such a WDM network, multiple data channels are impressed upon separate lasers or other light sources to produce multiple optical signals having different data signals and different optical carrier wavelengths. By various means, the different optical signals of differing optical wavelength are then impressed upon a single optical channel, such as an optical fiber now very commonly used in telecommunication systems. Thereby, multiple data channels are conveyed along a single optical path.

One of the most fundamental elements in a high-speed telecommunications network is an add/drop multiplexer (ADM). By various means, multiple signals are impressed upon a single physical channel, whether wire, coaxial cable, or fiber. In general, the multiplexing may assume different forms, such as time-division multiplexing, wavelength-division multiplexing, and others. As the physical channel passes through various intermediate nodes in the network, an ADM at that node must be able to extract one or more of the signals multiplexed on the channel and reinsert onto the channel a substitute signal without affecting the other signals not associated with that node.

Wavelength-division multiplexed optical systems have multiple-wavelength signals impressed on a single optical fiber, and an optical ADM for use in a WDM network must be able to extract from the fiber one or more signals at respective wavelengths and to impress upon the fiber other signals at those same wavelengths. In the '540 patent, Patel and Silberberg have disclosed a liquid-crystal add/drop multiplexer 8, illustrated in FIG. 1. This figure is meant to be explanatory only and does not necessarily accurately represent the optical paths or placement of elements. The signal received from the network fiber is designated IN and the signal transmitted to the fiber is designated OUT. The signal extracted from the fiber is designated DROP, and the signal impressed upon the fiber is designated ADD. The fibers are not illustrated in FIG. 1, and other well known and fairly simple optical components couple the free-space and bulk-optics optical paths illustrated in FIG. 1.

Figure 1:
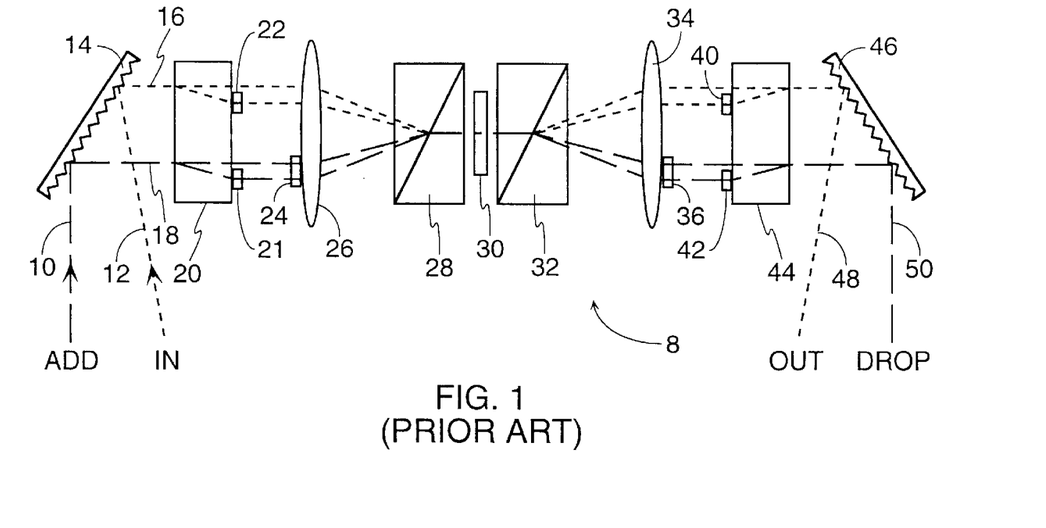
FIG. 1 is schematic representation of a multi-wavelength optical switch or cross-connect based upon a segmented liquid-crystal modulator.

The IN and ADD signals are received on optical paths 10, 12 that are incident upon a frequency-dispersive element 14 such as a grating. The frequency-dispersive element 14 spatially divides each of the multiple-wavelength signals on the IN and ADD paths 10, 12 into multiple and separate signals having respective wavelengths and respective paths 16, 18. Note that FIG. 1 illustrates the paths 16, 18 for only one wavelength. The paths for the other wavelengths are arranged in the perpendicular direction, that is, into the plane of the illustration. The optical processing to be described hereafter is performed in parallel for the multiple wavelengths.

The illustrated embodiment is designed to be insensitive to polarization of the input signals. Especially on fiber communication lines, it is nearly impossible to control the signal polarization, which may be changing over time due to environmental and other conditions. The frequency-separated signals on paths 16, 18 strike a first polarization-dispersive element 20, such as a block of properly oriented calcite crystal, which spatially separates each of the signals according to two perpendicular linear polarizations. However, the relative positions of the grating 14 and calcite crystal 20 are not clearly defined in the cited patents. Half-wave plates 21, 22 are placed in the path of the beams output from the calcite crystal 20 and having a first polarization. The half-wave plates 21, 22 thus convert those signals to the perpendicular second polarization. As a result, the two polarization components of both the IN and ADD signals are converted to respective signals that have the same polarization and are spatially separated.

Which polarization is rotated is not of primary importance. A third half-wave plate 24 is placed in the path of both parts of one of the signals, here the ADD signals. As a result, the two beams of the ADD signal are made to have a single polarization perpendicular to the polarization of the two beams of IN signal. It is appreciated that the number of half-wave plates can be reduced to two by combining the effects of plates 21, 24.

A lens 26 focuses all four beams toward a second polarization-dispersive element, preferably a Wollaston prism 28, which has the characteristic, in overly simplified language, that two beams of perpendicular polarization entering the prism 28 at the correct angles are spatially combined into a single beam.

The beam then strikes a segmented liquid-crystal array 30. A segmented liquid-crystal array 30 is similar to a standard twisted nematic polarization converter, but one of its electrodes is divided into multiple sub-electrodes, each separately controlled by respective electrical control signals. The beam illustrated in FIG. 1 strikes one of the segments. Beams corresponding to optical signals of different carrier wavelength (frequency) strike other segments and are each separately controlled.

Depending upon whether the electrical signal applied to the liquid-crystal segment of the wavelength illustrated in FIG. 1 is active or inactive, the IN and ADD signals both either pass through the liquid-crystal cell 30 with their polarizations unchanged or with their polarizations rotated by 90°. If their polarizations are rotated by 90°, the effect is to interchange the polarizations of the IN and ADD signals.

After exiting the liquid-crystal modulator 30, the two signals pass through another Wollaston prism 32, a lens 34, half-wave plates 36, 40, 42, a polarization-dispersive element 44, and a frequency-dispersive element 46, all arranged symmetrically to corresponding elements on the other side of the liquid-crystal cell 30. Thereby, the optical operations performed on the input side are undone on the output side. The result is that one set OUT of WDM signals is carried on one output path 48, and another set DROP is carried on another output path 50. Which signal is on which output path 48, 50 is determined by the states of the segments in the segmented liquid-crystal modulator 30. Equivalently stated, the liquid-crystal modulator 30 controls the switching from the ADD and IN signals to the DROP and OUT signals on a wavelength-by-wavelength basis.

The layout and optical paths can be made symmetric about a mirror plane passing through the liquid-crystal modulator 30. It thus becomes possible, as has been explained in the '540 patent to replace all the elements on the output side with a mirror that redirects the beams back through the elements on the input side, thus undoing the effects except for the liquid-crystal polarization modulation. By translating the input beams slightly away from the optical axis, the output beams will be translated in the opposite direction so that they can be separated from the input beams. This translation is most easily accomplished by slightly tilting one of the optical elements, such as the mirror.

Figure 2:
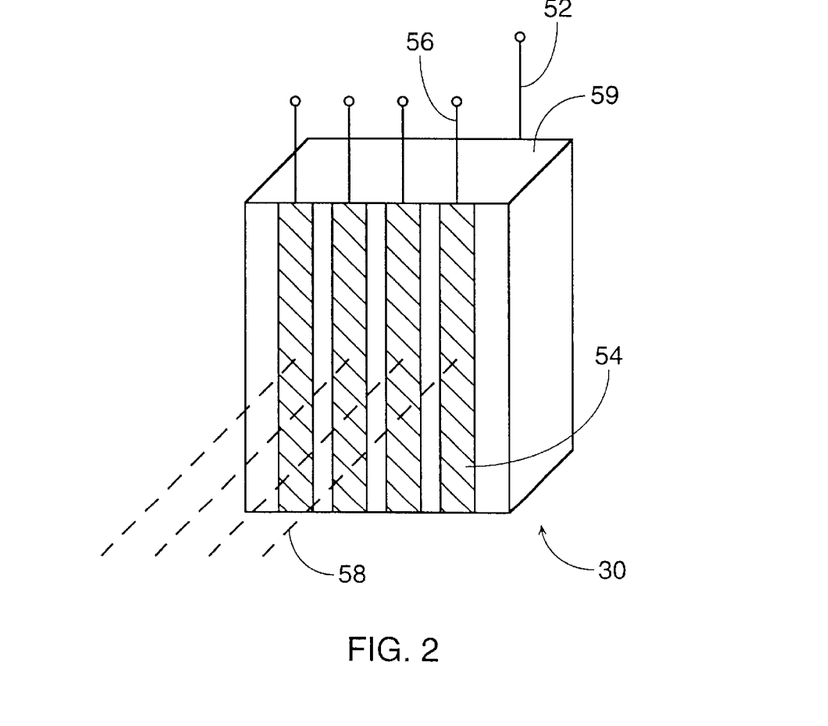
FIG. 2 is a schematic isometric illustration of segmented liquid-crystal cell.

The structure of the liquid-crystal modulator 30 is more definitely illustrated in the isometric view of FIG. 2. An unillustrated planar, semi-transparent electrode is formed on the back face of the cell and is powered, typically grounded, through lead 52. A plurality of semi-transparent segmented electrodes 54 are formed on the front face of the liquid-crystal cell and extend in the illustrated vertical direction but are electrically isolated in the horizontal direction. Separate leads 56 supply selective biasing signals to each of the respective segmented electrodes 56. A twisted nematic liquid crystal fills most of the gap 59 between the segmented electrodes 54 and the unillustrated back electrode. The schematic illustration shows neither the two alignment layers to differentially orient the liquid crystal at 90° at the two sides nor the usual glass supports on each side.

Respective optical beams 58 strike the different electrode segments 54. In particular, the one beam illustrated in FIG. 1 strikes one of the electrode segments 54. Other unillustrated beams strike the other electrode segments 54. In a WDM add/drop multiplexer, the different beams 58 striking the respective segments 54 carry separate signals on different WDM optical carrier wavelengths.

Figure 3:
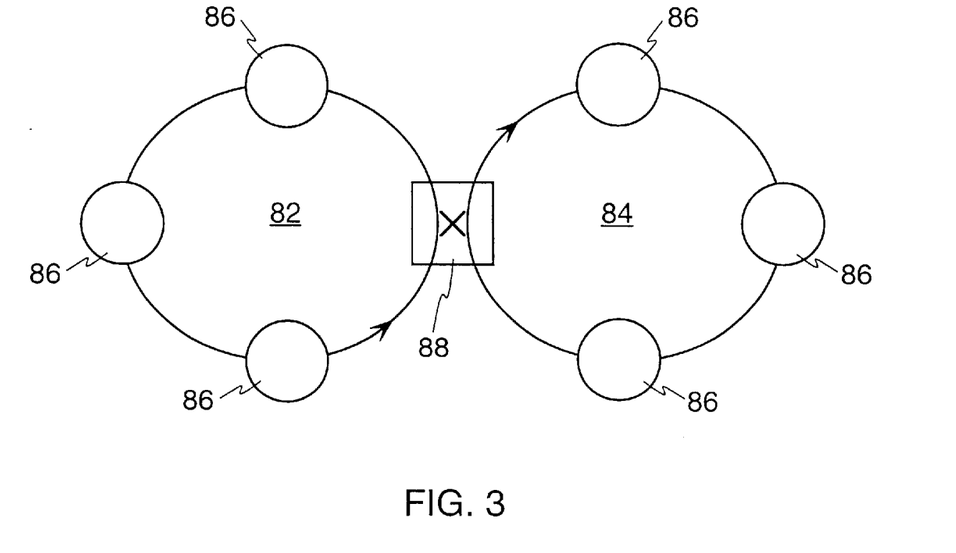
FIG. 3 is a network diagram of two interconnected fiber rings.

An add/drop multiplexer is usually associated with an electronic switch sending and receiving the ADD and DROP signals. However, an optical ADM can also be used as a cross-connect between two optical networks. A simple optical communications network, illustrated by the network diagram of FIG. 3, includes two fiber rings 82, 84, each having multiple nodes 86 associated with different users or entries to other paths. Absent further circuitry, the nodes 86 of each ring 82, 84 can communicate only with the nodes of that ring 82, 84. However, a multi-wavelength optical crossconnect 88 interconnects the two rings 82, 84 and selectively switches signals between the rings 82, 84 on a wavelength-by-wavelength basis, thus enabling wavelength-selective communication between any of the nodes 86 on both rings 82, 84.

The liquid-crystal optical switch 8 of FIG. 1 can beneficially be used as the selective cross-connect 88 for a WDM network. For example, the IN and OUT signals can be associated with one ring 82 and the ADD and DROP signals with the other ring 82. The liquid-crystal switch 8 of FIG. 1 further automatically provides the characteristic required for a WDM cross-connect in most WDM networks that, if a signal at a given wavelength $\lambda_i$ is switched from the first ring 82 to the second ring 84, then another signal at the same wavelength $\lambda_i$ is switched from the second ring 84 to the first ring 82.

The ring topology has enjoyed great use in fiber communications networks because it allows the networks to be made survivable or self-healing if two counter-rotating fibers are used in each ring. By counter-rotating, is meant that two parallel fibers propagate optical signals in antiparallel directions. As illustrated in the network diagram of FIG. 4, each ring 82, 84 includes one fiber 90 rotating in one direction and another fiber 92 rotating in the other direction. Different ring architectures are possible, but a simple one is that the first fiber 90 is the working fiber and the second fiber 92 is the protection fiber. Each ring 82, 84 is survivable because, if the working fiber 90 is cut at any point (and it is assumed that the protection fiber 92 is also cut at the same point), the two nodes 86 bracketing the break (or protection switches associated with the nodes) will switch all traffic from the working fiber 90 to the counter-rotating protection fiber 92, thereby avoiding the break but retaining full connectivity between all the nodes 86 on the ring 82, 84. The double-fiber ring even protects against the failure of a single node 86. The remaining nodes 86 remain in communication with each other.

Figure 4:
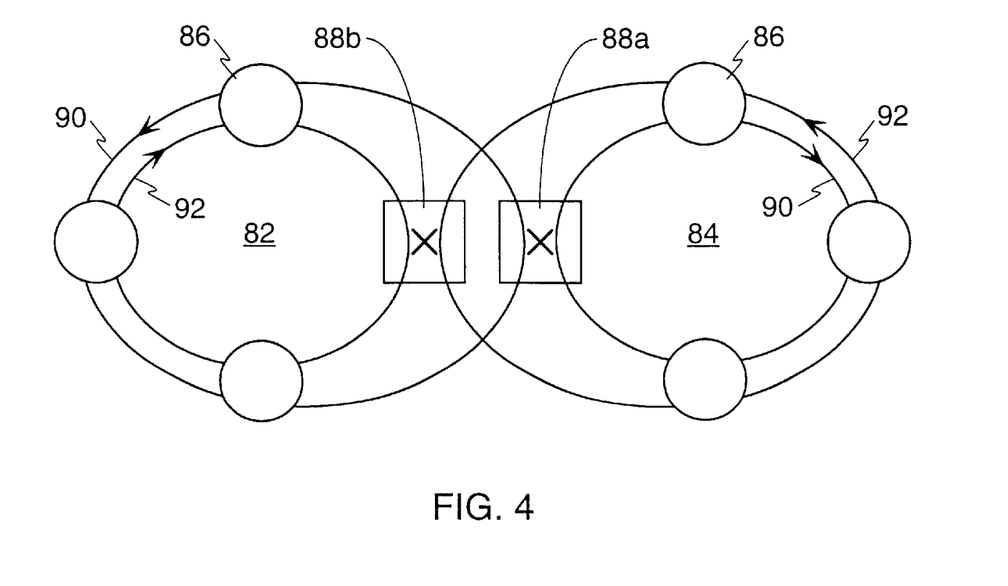
FIG. 4 is a network diagram of two interconnected two-fiber rings.

A two-ring double-fiber network can be interconnected through two cross-connects 88a, 88b. One cross-connect 88a is connected between the two working fibers 90 and the other crossconnect 88b is connected between the two protection fibers 92. The same interconnection scheme applies to other ring architectures. For example, all signals are broadcast on both fibers 90, 92 and the strongest received signal is used on the receiving end. For almost all ring architectures, the two cross-connects 88a, 88b are maintained in the same switching states.

Of course, the liquid-crystal switch 8 of FIG. 1 can be used for each of the cross-connects 88a, 88b if the two liquid-crystal switches 8 are similarly controlled.

However, any optical switching equipment is expensive to buy and maintain. It is greatly desired to simplify it.

It is further desired to design an optical switch that is compact, efficient, and usable in a telecommunications network.

SUMMARY OF THE INVENTION

According to one aspect of the invention, the elements of a liquid-crystal multi-wavelength switch are arranged to provide equally efficient diffraction of the two polarization components.

According to another aspect of the invention, the multiple wavelength signals on two pairs of optical paths may be similarly switched between the pairs using the same optics of a liquid-crystal multi-wavelength switch. The number of pairs of optical paths may be increased to a number higher than two.

According to yet another aspect of the invention, an anti-reflective coating is formed on the entrance side of the liquid-crystal modulator which includes the semi-transparent entrance electrode of the modulator, a quarter-wave dielectric layer formed on the entrance electrode, and another semi-transparent metal layer formed on the dielectric layer, preferably of the same thickness and composition as the entrance electrode.

DETAILED DESCRIPTION OF THE PREFERRED EMBODIMENTS

If the liquid-crystal multi-wavelength optical switch 8 of FIG. 1 is to be commercially implemented, the design should be insensitive to polarization and be compact and relatively inexpensive to fabricate.

Figure 5:
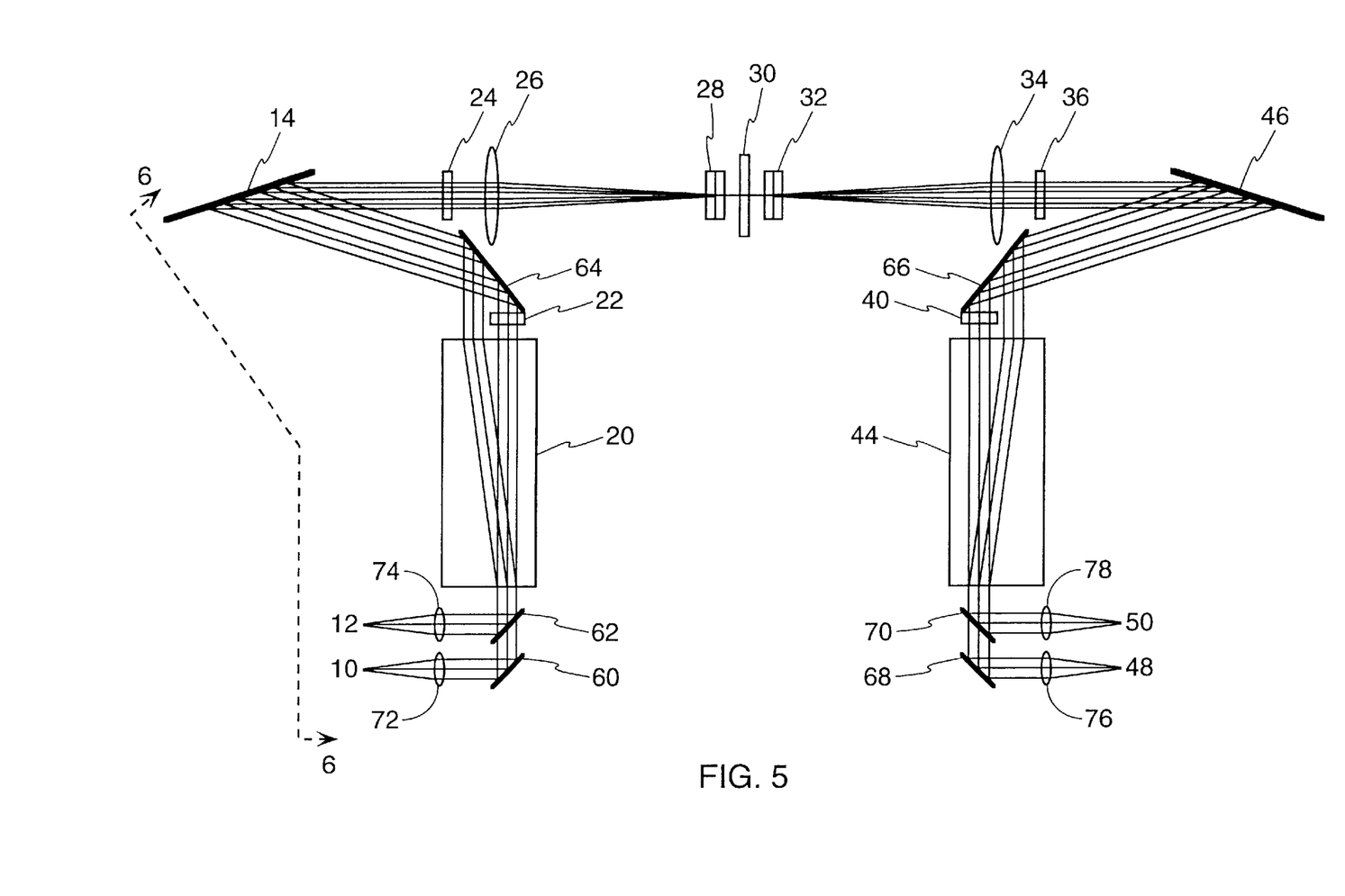
FIGS. 5 and 6 are plan and side views of a practicable cross-connect of the same type as FIG. 1.
Figure 6:
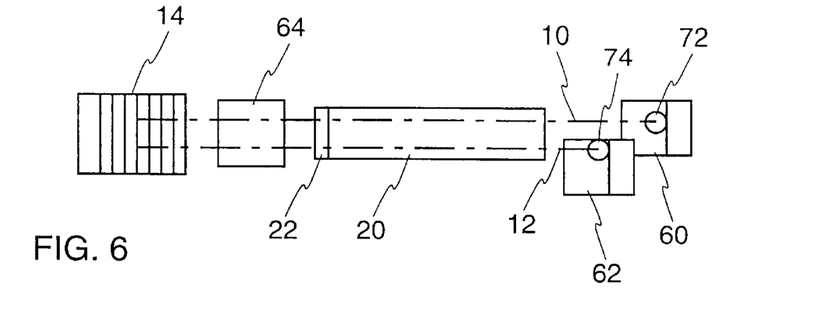

A more realistic layout for the liquid-crystal switch of FIG. 1 is illustrated in the plan and side views of FIGS. 5 and 6. The elements are commonly numbered with FIG. 1, but it is seen that the positions of the gratings 14, 46 and the calcite crystal 20, 44 are interchanged. This allows the placement of the half-wave plate 22 before the grating 14 so that all beams strike the grating with the same polarization. This eliminates any polarization dependence of the grating efficiency, and it is possible to arrange the configurations such that the beams incident on the grating have the polarization for which the grating has either the higher average efficiency or the lowest wavelength dependence. Further, there are additional mirrors 60, 62, 64, 66, 68, 70 and also lenses 72, 74 associated with the input beams 10, 12 and corresponding lenses 76, 78 on the output side. The input and output mirrors 60, 62, 68, 70 are not fundamentally required since the fibers and lenses could all be aligned parallel to the optic axis. These mirrors however advantageously provide clearance for the edges of the input lenses and their mounts so that the collimated beams are separated by just a sufficient lateral displacement that they do not overlap. Thereby, the size of the calcite crystal is minimized.

FIGS. 5 and 6 illustrate a design that has been optimized for signals in covering the wavelength range from 1545 to 1559 nm using gratings with 1200 grooves per millimeter and with the face of the grating 14 tilted 63° with respect to the input beams. The figure shows the beam paths for the two polarizations components for a single wavelength chosen to be approximately in the middle of the wavelength band of the system. Note that the beams 10, 12 are separated vertically while the calcite beam displacer separates the two polarizations horizontally.

Figure 7:
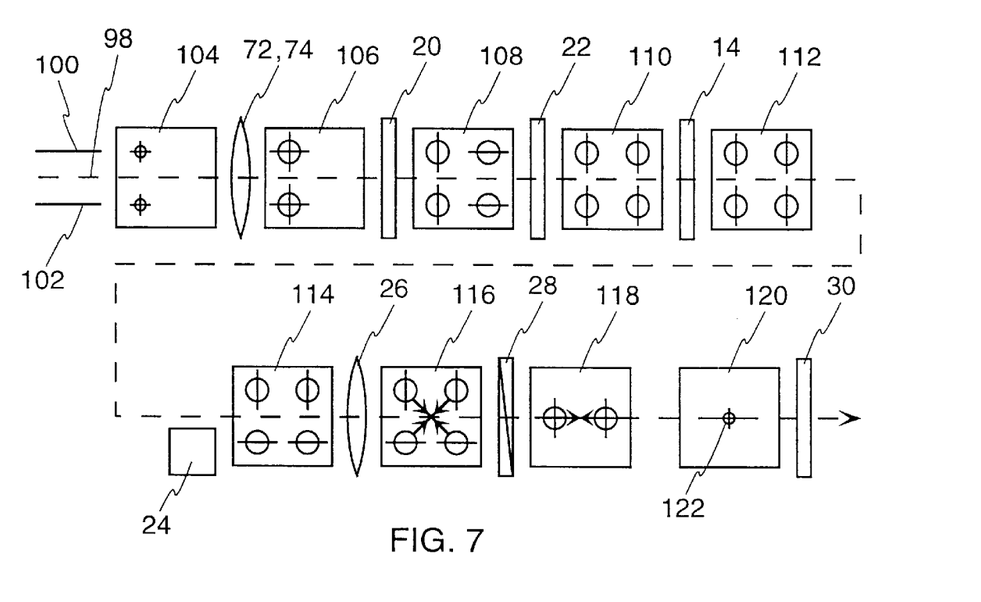
FIG. 7 is a schematic illustration of the evolution of beams in the cross-connect of FIG. 4 and 5.

It is possible to use much the same optical elements shown in the embodiments of FIG. 1 and of FIGS. 5 and 6 with four input fibers and four output fibers, that is, to achieve a dual 2×2 optical switch. To understand this effect and how to best implement it, it is worthwhile to illustrate the operation of the single 2×2 switch of FIG. 5. As illustrated in FIG. 7 for various elements arranged along an optical axis 98, two input fibers 100, 102 output two small but diverging beams illustrated in cross-sectional plane 104, each beam having components with the two polarizations. Although not illustrated as such, the planes are perpendicular to the optical axis 98. In plane 104, the beams are illustrated as being vertically displaced. The input lenses 72, 74 collimate the beams as illustrated in plane 106, the two polarization being retained. The calcite beam displacer 20 separates the two polarizations in the horizontal directions, as illustrated in plane 108. It is noted that the polarization dispersion occurs in a perpendicular (oblique) direction with respect to the separation of the two input fibers 100, 102. The half-wave plate 22 is disposed in the path of the horizontally polarized beams and causes their polarizations to rotate 90° so that all the beams are vertically polarized, as illustrated in plane 110.

Up to this point, all the beams contain all the active WDM wavelengths. However, the beams are then diffracted from the grating 14 into separate sub-beams for each of the previously illustrated beams. Plane 112 and subsequent planes show the beams for only a single wavelength. The half wave plate 24 intercepts the beams only for the one input fiber 102 and causes their polarization to rotate, as illustrated in plane 114. The main lens 26 is focused at the liquid-crystal cell 30, with appropriate adjustment for the Wollaston prism 28. The result, as illustrated in plane 116, is that the four beams are converging towards the Wollaston prism 28. As will be explained in more detail somewhat later, the beams of different polarizations are angularly offset entering the Wollaston prism 28, which then combines them into collinear beams having both polarizations. As illustrated in plane 118, there results two beams of combined polarization and they are continuing to converge across free space towards the liquid crystal cell 30. As illustrated in plane 120, all the beams are focused to a small spot 122 within the respective segment of the liquid-crystal cell 30. The Wollaston prism 28 combines the beams from the two input ports such that they differ only in their polarizations. The liquid-crystal switch elements can only cause a 90° rotation of the polarizations of the beams incident on it, or not cause any such rotation. Since, at this point, the two input signals differ only in their polarizations, the liquid-crystal switch elements can interchange them or not, depending on the state of the individual switching elements.

The operation on the output side is complementary to that on the illustrated input side and will not be further discussed here.

Figure 8:
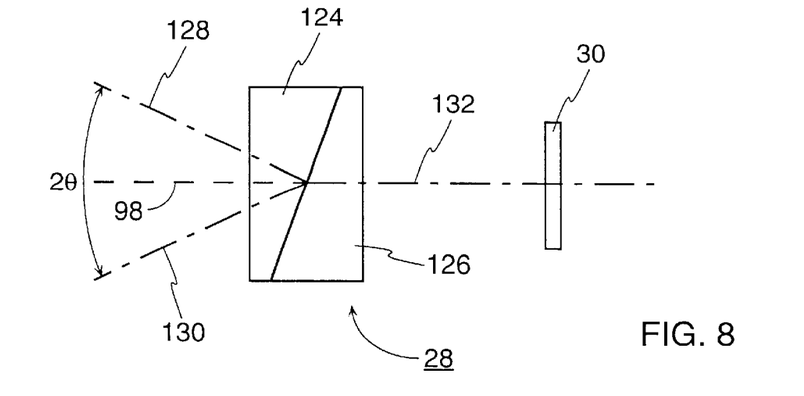
FIG. 8 is a schematic illustration of the combination of a Wollaston prism and liquid-crystal modulator processing two input beams.

The Wollaston prism 28, as illustrated in FIG. 8, includes two birefringent prisms 124, 126, joined to each other at an angle significantly oblique and non-perpendicular to the optical axis 98. Two polarized beams arrive at the Wollaston prism 28 on paths 128, 130 approximately equally offset from the optical axis 98 by an angle θ. The Wollaston prism 28 is designed with the optical axes of its two constituent prisms 124, 126 differently oriented so that the polarized beam arriving along the path 128 experiences the extraordinary refractive index of the first prism 124 and the ordinary refractive index of the second prism 126 while the orthogonally polarized beam arriving along the complementary path 130 relative to the optical axis 98 experiences the ordinary refractive index of the first prism 124 and the extraordinary index of the second prism 126. The Wollaston prism 28 combines the two differently oriented, differently polarized beams 128, 130 into a single collinear beam 132 along the optical axis 98. For calcite with 1550 nm light, a prism angle of 15.5° corresponds to a total beam separation 2θ of about 5°. Only two beams 128, 130 are illustrated in FIG. 8. Another two beams carry the beams associated with the other polarization, as illustrated in the plane 116. It is noted that the two beams 128, 130 are focused, not at the interface of the Wollaston prism 28, but at the liquid-crystal modulator 30.

Figure 9:
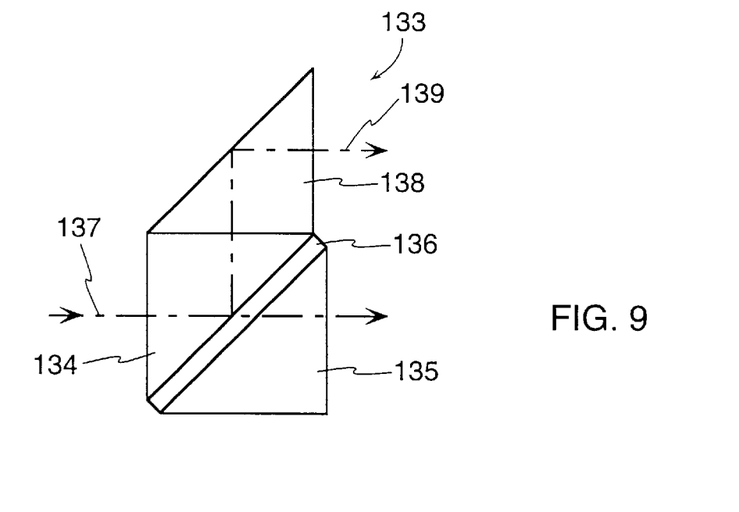
FIG. 9 is a cross-sectional view of a multi-layer dielectric thin-film polarization beam splitter.

The embodiments of FIGS. 1 and 5 use calcite blocks 20, 44 to spatially separate the two polarizations with a high extinction ratio between the beams, and the calcite blocks further provides parallel output beams. However, calcite blocks are expensive and bulky, and for the advanced systems with close WDM wavelength spacings, even larger calcite blocks are required. An alternative approach, which provides a lower-cost and more compact apparatus particularly for large beam diameters, relies upon multi-layer dielectric thin-film polarization beam splitters. A multi-layer dielectric thin-film polarization beam splitter 133, illustrated in cross section in FIG. 9 includes first and second optical prisms 134, 135 with a dielectric thin-film filter 136 tuned to the wavelength and angle at the 45° interface between the two prisms 134, 135. An input beam 137 is incident on one of the perpendicular faces of the first prism, and a third prism 138 is optically joined to the other perpendicular face of the first prism 134 with its 45° face parallel to the dielectric thin film 136. Thereby, one polarization of light on the input beam is transmitted essentially straight through the dielectric thin film 136 while the other polarization is reflected by the dielectric thin film and is again reflected on the 45° face of the third prism 138 to form another output beam 139 parallel to but spatially separated from the input beam 137. Such a beam splitter 133 is available as the laser-line polarizing cube beam splitter sold by Melles Griot, Product No. 03 PBS 08x. A dielectric thin-film beam splitter does not provide as high a polarization extinction coefficient as does a calcite block, but other elements of the switches of FIGS. 1 and 5 overcome this deficiency. The second polarization-dispersive element 28, usually a Wollaston prism located just before the liquid-crystal modulator 30, will deflect the components of the incident beams with the wrong polarization out of the paths of the components with the correct polarization. A simple iris or other aperture located just before the modulator 30 can block the spurious beams.

From this presentation with respect to FIG. 7, it becomes clear that the liquid-crystal switches of FIGS. 1 and 5 are not fundamentally limited to only two input or two output beams. Providing that multiple beams not interfere or become inseparably coincident, any number of input and output channels can be accommodated within the optics of FIGS. 1 and 5. The primary requirement for a multiplicity of input beams is that for each wavelength channel the optics focus the multiple beams, in particular all their polarization-subdivided sub-beams, onto a single segment 54 of the segmented liquid-crystal modulator 30. That is, the number of input fibers is not limited to two. In the case of four input fibers, there will be eight beams in the central part of switch.

In the immediate case of interconnecting two protected rings, the liquid-crystal switch must switch four WDM input beams to four WDM output beams, but the switching is done doubly pair wise. That is, if a particular wavelength is switched from a first ring to a second ring, then the same wavelength is switched from the second ring to the first ring. Additionally, two paths on the first ring are selectively switched in the same selective manner to two paths on the second ring.

Figure 10:
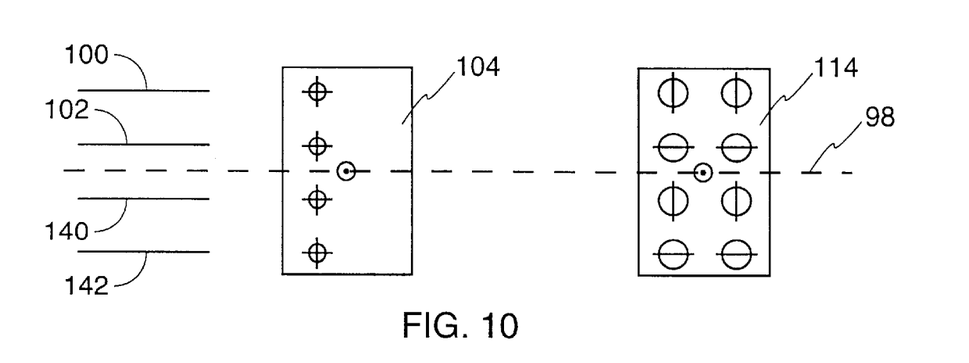
FIG. 10 illustrates one embodiment of the invention in which four vertically arranged input beams are divided into eight polarization-divided beams.

The most straightforward approach for coupling the light into the dual switch is incorporated into a vertical dual having beam patterns illustrated in FIG. 10. Four input paths are arranged in a vertical column. Four vertically arranged input fibers 100, 102, 140, 142 produces four vertically arranged beams in the plane 104 and eight beams in a rectangular arrangement in the plane 114. The two upper fibers 100, 102 correspond to the prior art single cross-connect 88a of FIG. 4 and the two lower fibers 140, 142 correspond to the cross-connect 88b. Alternatively stated, the fibers 100, 140 are connected to the first double-fiber ring 82 and the other fibers 102, 142 are connected to the second ring 84. The major structural change to the optics is that two half-wave plates 24 intercept the pairs of optical paths associated with the fibers 102, 142, the optical paths associated with the other fibers 100, 136 not being so polarization rotated. Similarly two half-wave plates 40 are required on the output side.

The arrangement of FIG. 5 can be easily modified to accommodate four fibers by including four input lenses 72, 74 and four input mirrors 60, 62 arranged along the optical axis. The lenses and mirrors further from the calcite crystal 20 (or other polarization beam splitter) are higher than those closer to allow the beams reflected from the back mirrors to clear the closer mirrors. The same modifications are made on the output side.

Figure 11:
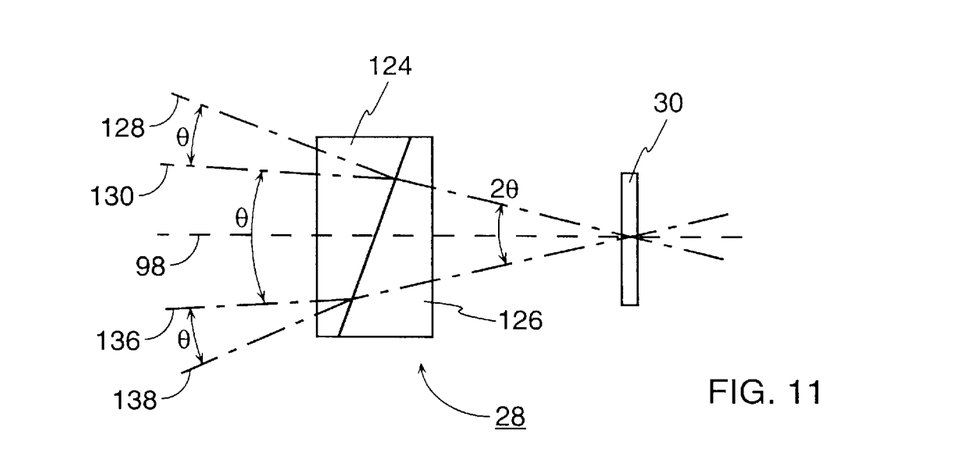
FIG. 11 is a schematic illustration similar to FIG. 8 illustrated how the four input beams of FIG. 10 are processed by the Wollaston prism and liquid-crystal modulator of FIG. 8.

Assuming angular separations of θ, shown in FIG. 11, between respective neighboring beams 128, 130, 136, 138, where the beams 128, 130 come from the upper input fibers 100, 102 and the beams 136, 138 come from the lower input fibers 140, 142, the Wollaston prism 124 will combine the upper two beams such that they pass through the liquid-crystal cell 30 at an angle of +θ and will combine the lower beams such that they pass through the cell 30 at an angle of −θ. For a typical value of θ of 5°, the total angular spread among the beams 128, 130, 136, 138 is about 15°, compared to the previous 5° of FIG. 8. Such a large operating angle puts severe requirements on the optics. The main lens 26 is operated further off the optical axis 98 to produce larger convergence angles, thus emphasizing any distortions in the lens. Also, the Wollaston prism 28 is operated further away from the optical axis 98, which may begin to introduce some distortions of the converging and non-collimated beams 128, 130, 136, 138 passing through it.

Figure 12:
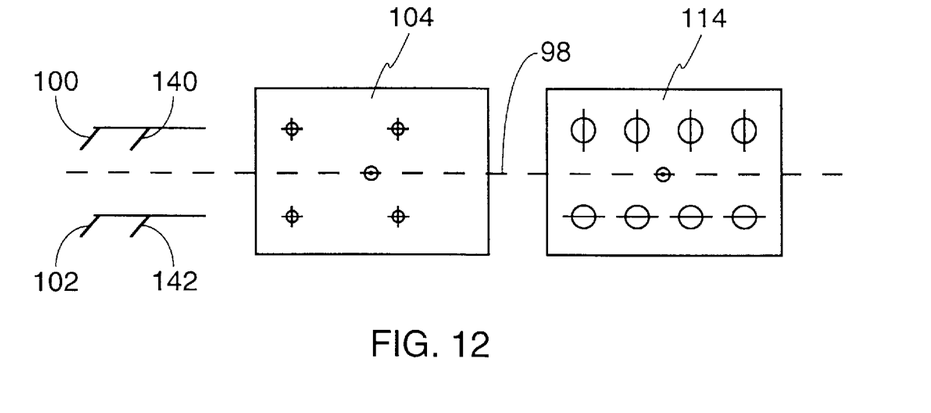
FIG. 12 illustrates another embodiment of the invention in which four rectangularly arranged input beams are divided into eight polarization-divided beams.

The vertical operating angles can be reduced by using a rectangular fiber array, as illustrated in FIG. 12, in a configuration of a horizontal dual. In this configuration, a first pair of fibers 100, 140 have a same height but are laterally displaced, as are a second pair of fibers 102, 142 but at a different height. When the calcite crystal or other polarization beam splitter laterally displaces the polarization components, there results an array of eight beams, arranged two vertically and four laterally. A side view for the beams of FIG. 12 as they pass through the Wollaston prism 28 is not distinguishable from the view of FIG. 8. However, in this case there are four lateral angles. Nonetheless, this configuration is believed to suffer less from main lens distortion and the angles in the Wollaston prism are better.

While not necessary, it is convenient to use turning mirrors 60, 62, 68, and 70 interposed in the respective collimated beams between the input/output lenses and the polarization-dispersive elements 20, 44. The use of the mirrors allows the input/output lenses to be physically separated, providing space for the mechanical mounts for the lenses and fibers. Since the beams are collimated and contain both polarizations in the space between the lenses and the polarization-dispersive elements, having different physical path lengths does not significantly impact the optical performance. The turning mirrors 64, 66 are also not necessary but are advantageous for obtaining a more compact mechanical design, with appropriate space for mechanical mounts for the main lenses.

Figure 13:
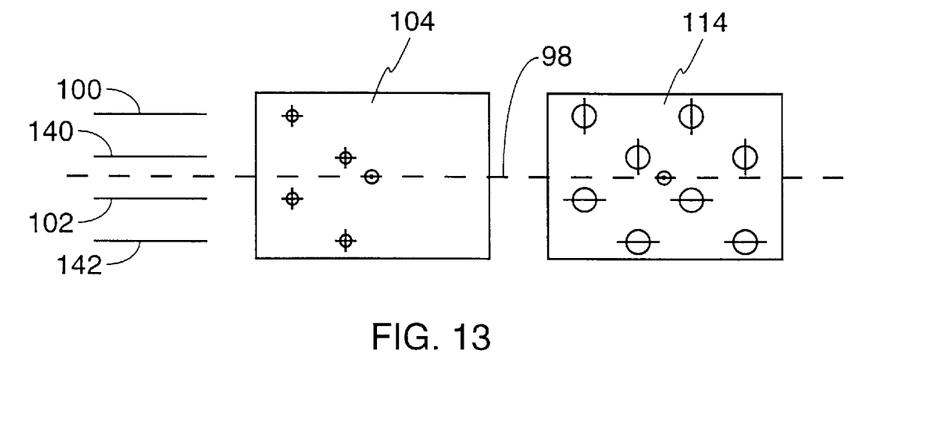
FIG. 13 illustrates a third embodiment of the invention in which four staggered input beams are divided into eight polarization-divided beams.

Other input configurations are possible, such as the staggered dual illustrated in FIG. 13, in which the four beams are arranged in two horizontally and vertically separated pairs, the beams of each pair being vertically separated. This configuration requires a large birefringence displacement.

All of these various configurations present different optical considerations, not further considered here.

The input fiber and input beam configurations for the dual units, illustrated in FIGS. 10, 12, and 13, can be used for single, reflective-geometry units, in which the input fibers and beams for one of the switches in the dual are used as the inputs, and the input fibers and beams of the other switch of the dual are used as the outputs. The horizontal configuration of FIG. 12 will typically give better optical performance, but any of the dual configurations can be used for reflective-geometry units. The reflective embodiment offers at least two advantages. Half of the optics apart from the liquid-crystal modulator can be eliminated, since the light, once having been modulated, is reflected back through the input optics. Secondly, there should be no question of misalignment between the input and output optics. However, the reflective embodiments present some problems.

The first problem is that, to preserve the essential symmetry between the input and output optics (which are now the same), the reflector must be located in very close proximity to the liquid-crystal modulator, preferably as the back electrode. This means that the signal beams will pass through the modulator in both directions. When used in this geometry, a twisted nematic cell in its waveguiding state would undo in the backward pass the polarization rotation accomplished in the forward pass, and would thus always produce a net polarization rotation of zero. This can be avoided if the twisted nematic liquid crystal is replaced by an untwisted nematic liquid crystal having both principle axes aligned at 45° with respect to both beam polarizations.

The thickness of the liquid crystal is adjusted to provide a $\pi/2$ phase shift between the fast and slow polarizations on a single pass through the cell when the cell is in its unbiased state. A double pass produces an accumulated phase shift of $\pi$, which is equivalent to rotating the polarization by 90°.

Figure 14:
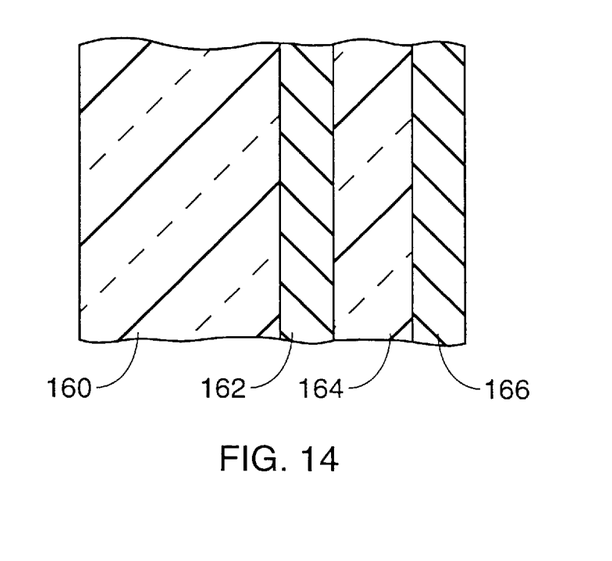
FIG. 14 is a cross-sectional view of a reflective embodiment of the invention.

A second problem is that the liquid-crystal modulator tends to produce spurious reflections, particularly at the interfaces of the glass plates forming the two sides of the cell. These reflections deleteriously may couple light to the wrong output fiber, resulting in crosstalk. In the transmissive embodiments, the reflections can be rejected by slightly tilting the cell off the optical axis so that reflections go off axis. In reflective embodiments, it is not feasible to do this, since the reflector needs to be very close to the liquid-crystal modulator. The magnitude of these reflections, at the front face of the modulator, and at the electrode on the front face of the cell, can be reduced by using conventional multilayer dielectric film technology to form an antireflective coating. However, with these techniques it may be difficult to achieve sufficiently low reflectivity from the front electrode. One way this can be achieved is illustrated in FIG. 14 for an anti-reflective coating including one of the electrodes. Over a transparent plate 160, usually of glass, that forms the support on the entrance side of the cell is deposited a semitransparent metallic layer 162, essentially of the same material and thickness as will be used for the front electrode. A transparent dielectric layer 164 is deposited on the metallic layer 162 to an optical thickness of ¼ of the average wavelength being switched. The semitransparent front electrode layer 166 is then deposited on top of the dielectric layer 164, and subsequent processing of the cell including segmented patterning of the front electrode layer 166 is the same as for conventional liquid-crystal modulators. The reflections from the two semitransparent metal films 162, 166 will be 180° out of phase and will cancel.

While we have described the reflective embodiments in terms of a single switch, the same principles used to extend the single transmission-geometry switch into a dual can be used to extend the reflective-geometry switches into dual switches. Of course, the optical requirements become more demanding.

Although the above discussion addressed the use of a dual 2×2 liquid-crystal switch for interconnecting two protected telecommunication rings, the inventive switch and its use are not so limited.

It is possible to use more than two pairs of input channels. That is, three or more pairs of fibers can be similarly switched by a common set of optics. Of course, the optical requirements become more demanding.

The same concepts can be applied to multiple 1×2 or 2×1 switches, that is, where some of the inputs or the outputs of the described system are not used.

The use of the liquid-crystal switch of the invention is not limited to telecommunication systems but can be useful in other applications requiring similar switching of multiple optical channels.

The liquid crystal used is not limited to the described twisted nematic. Other liquid crystals are available with the required selective polarization effects. Although the described switches have been insensitive to polarization, for some applications a polarization-insensitive switch may be acceptable.

The invention thus allows a more complex optical switch without the need for replicating most of the optical components.

What is claimed is:

1. A liquid-crystal multi-wavelength switch, comprising:
   a frequency-dispersive element;
   a first polarization-dispersive element arranged in series with said frequency-dispersive element;
   a combination of said frequency-dispersive element and said first polarization-dispersive element receiving four multi-wavelength beams and producing for each of said multi-wavelength beams a plurality of sets of single-wavelength first and a second polarization component beams, wherein the single-wavelength first polarization component beams have a first polarization and the single-wavelength second polarization component beams have a second polarization, the first and second polarizations being orthogonal;
   polarization rotatory optics receiving the plurality of single-wavelength polarization component beams from said combination of said frequency-dispersive element and said first polarization-dispersive element and rotating the polarization of the plurality of single-wavelength polarization component beams such that the plurality of single-wavelength first and second polarization component beams of said first and second multi-wavelength beams have the first polarization and the plurality of single-wavelength first and second polarization component beams of said third and fourth multi-wavelength beams have the second polarization; and
   a segmented liquid-crystal modulator having a plurality of electrode segments downstream of said polarization rotatory optics, each of said segments receiving a respective one of said sets of single-wavelength first and second polarization component beams from said polarization rotatory optics;
   wherein said liquid-crystal modulator comprises on a side thereof facing said first polarization-dispersive element and said polarization rotatory optics:
      a first semi-transparent electrode of a semi-transparent material;
      a first dielectric layer formed on said first electrode and having a thickness related to a quarter wavelength of light in said single-wavelength first and second polarization component beams; and
      a semi-transparent second layer formed on said dielectric layer and comprising a semitransparent material.

2. The switch of claim 1, wherein said second layer has a same thickness as and is composed of a same material as said first electrode.

3. A liquid-crystal multi-wavelength switch, comprising:
   a frequency-dispersive element;
   a first polarization-dispersive element arranged in series with said frequency-dispersive element;
   a combination of said frequency-dispersive element and said first polarization-dispersive element receiving four multi-wavelength beams and producing for each of said multi-wavelength beams a plurality of sets of single-wavelength first and a second polarization component beams, wherein the single-wavelength first polarization component beams have a first polarization and the single-wavelength second polarization component beams have a second polarization, the first and second polarizations being orthogonal;
   polarization rotatory optics receiving the plurality of single-wavelength polarization component beams from said combination of said frequency-dispersive element and said first polarization-dispersive element and rotating the polarization of the plurality of single-wavelength polarization component beams such that the plurality of single-wavelength first and second polarization component beams of said first and second multi-wavelength beams have the first polarization and the plurality of single-wavelength first and second polarization component beams of said third and fourth multi-wavelength beams have the second polarization;
   a segmented liquid-crystal modulator having a plurality of electrode segments downstream of said polarization rotatory optics, each of said segments receiving a respective one of said sets of single-wavelength first and second polarization component beams from said polarization rotatory optics; and
   a reflective surface disposed on a side of said liquid-crystal modulator opposite said frequency-dispersive and first polarization-dispersive elements and reflecting said single-wavelength first and second polarization component beams to said elements, wherein said reflective surface forms a second electrode of said liquid-crystal modulator.

4. A telecommunications network, comprising:
   a first optical fiber ring comprising a first optical fiber and a second optical fiber for carrying a multi-wavelength signal in respective opposite directions around said first ring;
   a second optical fiber ring comprising a third optical fiber and a fourth optical fiber for carrying a multi-wavelength signal in respective opposite directions around said second ring; and
   a cross-connect selectively coupling said first optical fiber and said third optical fiber and coupling said second optical fiber and said fourth optical fiber and comprising
      a frequency-dispersive element,
      a polarization-dispersive element, and
      a segmented liquid-crystal polarization modulator having a plurality of segmented electrodes, each of said segmented electrodes receiving from said frequency-dispersive and polarization-dispersive elements respective single-wavelength signals of said first, second, third, and fourth fibers.

5. The network of claim 4, wherein said polarization-dispersive element comprises a Wollaston prism.

6. The network of claim 4, further comprising a second polarization-dispersive element.

7. The network of claim 4, wherein said second polarization-dispersive element, said frequency-dispersive element, said Wollaston prism, and said liquid-crystal modulator are arranged in the stated sequence along an optical axis.

8. The network of claim 7, wherein said second polarization-dispersive element comprises a multi-layer dielectric thin-film beam splitter.

* * * * *